United States Patent [19]
Parks

[11] Patent Number: 4,585,262
[45] Date of Patent: Apr. 29, 1986

[54] AIR DAM FOR MOTOR VEHICLE
[75] Inventor: Robert R. Parks, Warren, Mich.
[73] Assignee: General Motors Corporation, Detroit, Mich.
[21] Appl. No.: 709,417
[22] Filed: Mar. 7, 1985
[51] Int. Cl.⁴ .............................................. B62D 37/00
[52] U.S. Cl. .................................................. 296/1 S
[58] Field of Search ................................... 296/1 S, 91
[56] References Cited
U.S. PATENT DOCUMENTS

| 3,618,998 | 11/1971 | Swauger | 296/1 S |
| 4,119,339 | 10/0978 | Heimburger | 296/1 S |
| 4,131,308 | 12/1978 | Holka et al. | 296/1 S |
| 4,325,563 | 4/1982 | Brandon et al. | 280/154.5 R |
| 4,398,764 | 8/1983 | Okuyama | 296/1 S |

FOREIGN PATENT DOCUMENTS 3145257 5/1983 Fed. Rep. of Germany .

*Primary Examiner*—Robert R. Song
*Attorney, Agent, or Firm*—Charles E. Leahy

[57] ABSTRACT

An air dam is comprised of a plurality of flexible bristles which have upper ends fixedly mounted on a mounting bracket adapted for mounting on the underside of the vehicle front end so that the bristles depend generally vertically toward the road surface. The bristles are mounted in closely packed relationship providing an air impermeable wall which effectively functions as an air deflecting dam. The bristles are sufficiently stiff to resist being bent by the air flow and yet are sufficiently yieldable to bend rearwardly when the air dam brushes over a curb and then bend forwardly as the vehicle backs away from the curb. The mounting bracket extends in a curvilinear path to provide a desired plan form configuration matching the plan form configuration of the vehicle body.

2 Claims, 4 Drawing Figures

AIR DAM FOR MOTOR VEHICLE

The invention relates to an air dam for a motor vehicle and more particularly provides an air dam extending downwardly from the underside of the vehicle and formed by a plurality of closely packed stiff flexible bristles which yield upon impact against a curb or other obstruction.

BACKGROUND OF THE INVENTION

It is known that the aerodynamic characteristics of vehicle bodies can be improved by an air dam mounted underneath the front bumper of the car and extending into proximity with the roadway. The height of such an air dam is limited by concerns about clearance with driveway inclines, curbs, and other obstructions.

The prior art has recognized that molded plastic air dams can yield somewhat upon impact against a curb. However, vehicle styling considerations dictate that the air dam should have a curved shape when viewed in plan view. This curved plan view configuration provides an inherent stiffening of the air dam which impedes the extent to which such a plastic air dam can yield to pass over a curb or other obstruction. When the vehicle backs away from the curb, the dam cannot yield.

It would be desirable to provide a vehicle front end air dam which would yield in either direction to pass over a curb when the vehicle parks against the curb and when the vehicle backs away from the curb without damage to the air dam or without making an objectionable scraping noise.

SUMMARY OF THE INVENTION

An air dam according to the present invention is comprised of a plurality of flexible bristles which have upper ends fixedly mounted on a mounting bracket adapted for mounting on the underside of the vehicle front end so that the bristles depend generally vertically toward the road surface. The bristles are mounted in closely packed relationship providing an air impermeable wall which effectively functions as an air deflecting dam. The whiskers are sufficiently stiff to resist being bent by the air flow and yet are sufficiently yieldable to bend rearwardly when the air dam brushes over a curb and then bend forwardly as the vehicle backs away from the parking curb. The mounting bracket extends in a curvilinear path to provide a desired plan form configuration matching the plan form configuration of the vehicle body.

Thus, the object, feature and advantage of the invention resides in the provision of an air dam comprised of a plurality of yieldable bristles mounted in closely packed relation along a mounting member attached to the underside of the vehicle body so that the bristles depend vertically downward to define an air deflecting dam and are yieldable to permit the air dam to pass quietly over a parking curb without damage thereto.

DESCRIPTION OF THE PREFERRED EMBODIMENT

Figure 1:
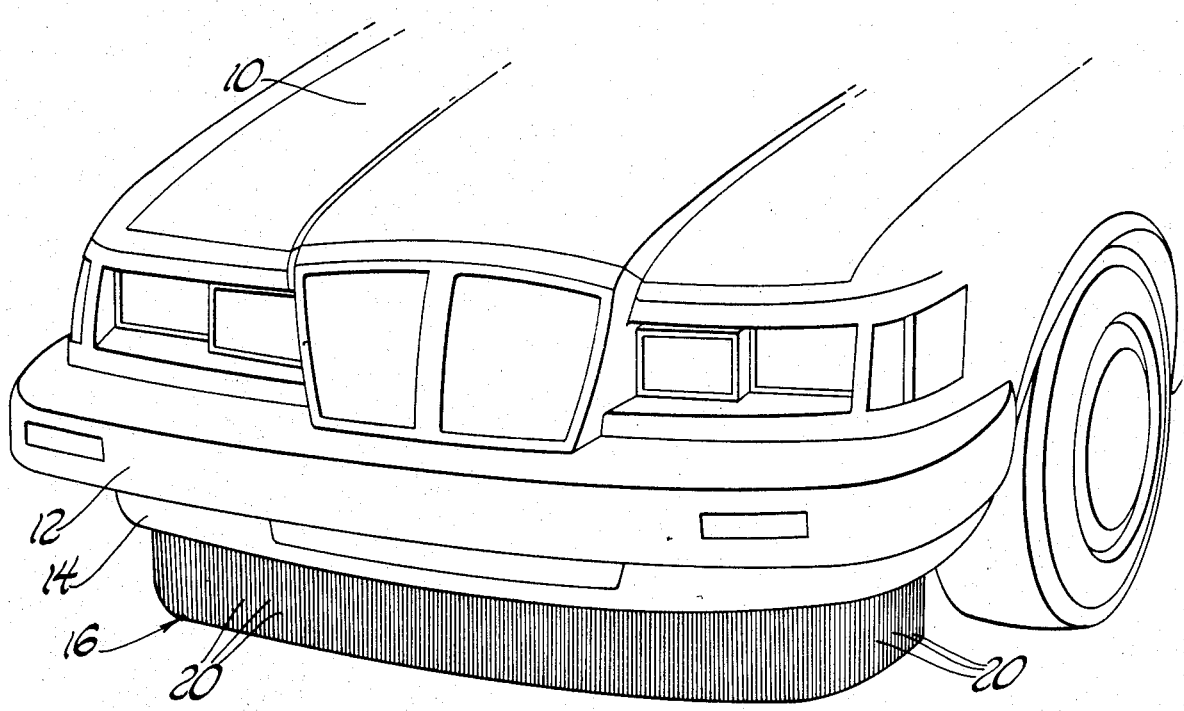
FIG. 1 is a perspective view of the front end of a motor vehicle body having an air dam according to the invention.
Figure 2:
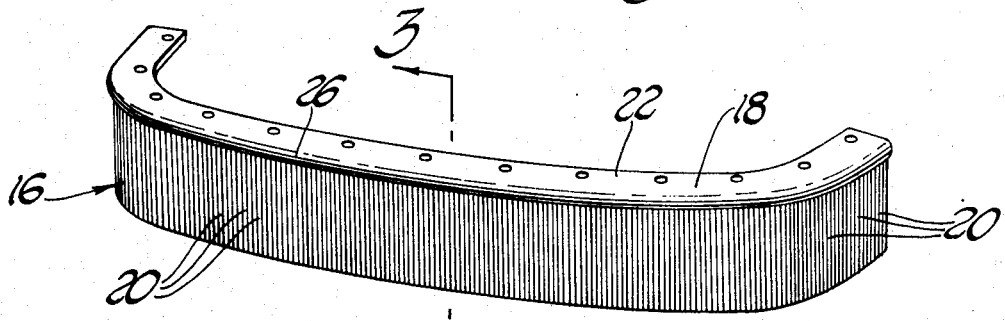
FIG. 2 is a perspective view showing the air dam.
Figure 3:
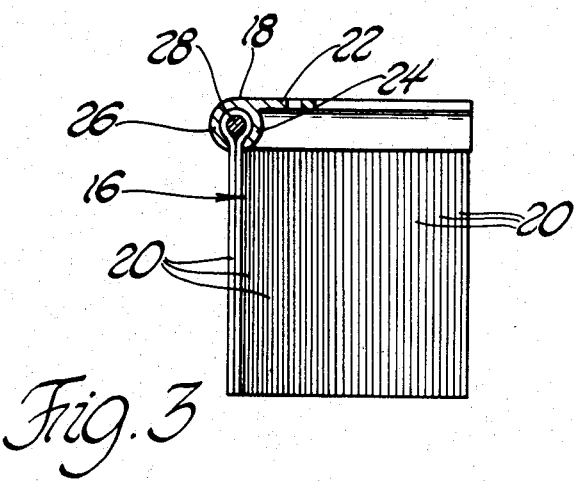
FIG. 3 is a sectional view taken in the direction of arrows 3—3 of FIG. 2.
Figure 4:
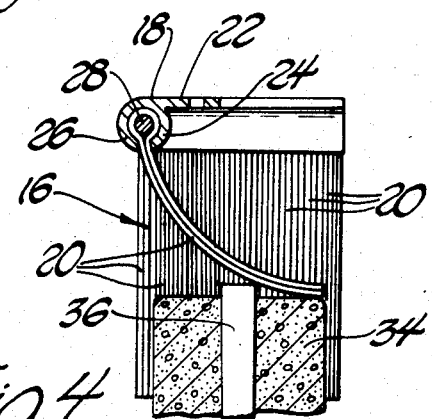
FIG. 4 is a view showing the air dam yielding to pass over a curb.

Referring to FIG. 1, there is shown a vehicle body 10 including a front bumper 12 having a lower trim portion 14. An air dam, generally indicated at 16 is attached to the underside of the lower trim portion 14 of bumper 12. As best seen in FIGS. 3 and 4, the air dam 16 is comprised of a mounting bracket 18 and a plurality of flexible elements such as bristles 20. As best seen in FIG. 3, the mounting bracket 18 is preferably an extrusion including a mounting leg 22 and a pair of depending spaced apart legs 24 and 26. The bristles 20 are preferably cut at twice the length of the desired height of the air dam 16. The bristles 20 are folded in half and wrapped around a retaining wire 28. The retaining wire is situated between the legs 24 and 26 of the mounting member 18 and the legs are crimped around the wire 28 so that the bristles 20 are captured in place. As best seen in FIG. 2, the bristles 20 stand vertically directly adjacent one another in closely packed relation to define a substantially air impermeable deflecting curtain.

As best seen in FIG. 2, the mounting bracket 18 is bent into a desired curvilinear plan form configuration for matching the curved plan form configuration of the lower trim portion 14 of bumper 12. Referring to FIG. 4 there is shown a typical concrete parking curb 34 which is mounted on a parking lot surface by a stake 36. Motor vehicles are typically driven up against such curbs 34 to the point where the front tires engage against the curb 34. As seen in FIG. 4, the bristles 20 yield rearwardly to permit the air dam 16 to pass over the curb 34. The bristles 20 then are restored to their normal vertical depending position. Likewise when the motor vehicle is backed away from the bumper 34 the bristles 20 may yield forwardly relative to the mounting member 18 to pass over the curb 34.

Thus it will be understood that the diameter, material, density, and stiffness of the bristles 20 must be selected to provide sufficient stiffness to function as an air impermeable dam against the air stream flow encountered during high speed vehicle operation, and yet the bristles must be sufficiently yieldable to bend and pass over the curb 34 without breaking or being permanently deformed. Furthermore, it will be understood that the bristle material may be colored to match the exterior color of the vehicle body. The bristles are not limited to a circular cross section and could be molded to have a curvilinear shape so that the bristles could curve somewhat rearwardly as viewed in FIG. 3 as may be desired for vehicle aesthetics.

Thus it is seen that the invention provides a new and improved motor vehicle air dam comprised of closely packed stiff bristles which yield to pass over a parking curb.

The embodiments of the invention in which an exclusive property or privilege is claimed are defined as follows:

1. An air dam for attachment to the underside of a motor vehicle and extending downwardly therefrom into proximity with the road surface and potential interference with curbs or like obstructions extending above the road surface; comprising a plurality of bristles having upper ends and lower ends; and a mounting bracket adapted for attachment on the underside of the motor vehicle and mounting the plurality of flexible bristles in closely packed relationship along the length of the mounting bracket in a generally vertical depending orientation whereby the depending bristles normally function to provide an air deflecting dam and flexibly yield upon contact with an obstruction so that the bristles are restored to their normal air dam function when the motor vehicle is moved away from the obstruction.

2. An air dam for attachment to the underside of a motor vehicle extending downwardly therefrom into proximity with the road surface and potential interference with curbs or like obstructions extending above the road surface; comprising:

a plurality of bristles folded in half;

a retaining wire located in the bight portion of the folded inhalf bristles;

a mounting bracket adapted for attachment on the underside of the motor vehicle and having spaced apart legs crimped around the bight portion of the bristles and the retaining wire whereby the bristles are securely attached to the mounting bracket to extend generally vertically downward therefrom in tightly packed relation to define an air impermeable curtain;

said bristles being sufficiently stiff to resist bending by an oncoming air flow at high vehicle speeds and yet sufficiently flexible to brush over an obstruction without permanent deformation thereto so that the air curtain function is assuredly restored when the motor vehicle is moved away from the obstruction.

* * * * *